US009943955B2

(12) United States Patent
Bozzano

(10) Patent No.: US 9,943,955 B2
(45) Date of Patent: Apr. 17, 2018

(54) PORTABLE WORKSTATION

(71) Applicant: James Antony Bozzano, West Chester, PA (US)

(72) Inventor: James Antony Bozzano, West Chester, PA (US)

( * ) Notice: Subject to any disclaimer, the term of this patent is extended or adjusted under 35 U.S.C. 154(b) by 0 days.

(21) Appl. No.: 15/587,916

(22) Filed: May 5, 2017

(65) Prior Publication Data

US 2017/0320209 A1 Nov. 9, 2017

Related U.S. Application Data

(60) Provisional application No. 62/332,455, filed on May 5, 2016.

(51) Int. Cl.

| | |
|---|---|
| ***B62B 1/00*** | (2006.01) |
| ***B25H 1/04*** | (2006.01) |
| ***B25H 3/02*** | (2006.01) |
| ***A47C 7/02*** | (2006.01) |
| ***A47C 4/02*** | (2006.01) |
| ***A47B 83/02*** | (2006.01) |
| ***B25H 1/12*** | (2006.01) |
| ***A47B 83/04*** | (2006.01) |
| ***A47B 23/04*** | (2006.01) |

(52) U.S. Cl.

CPC ............... *B25H 1/04* (2013.01); *A47B 23/04* (2013.01); *A47B 83/02* (2013.01); *A47B 83/045* (2013.01); *A47C 4/024* (2013.01); *A47C 7/021* (2013.01); *B25H 1/12* (2013.01); *B25H 3/02* (2013.01); *A47B 2023/049* (2013.01); *A47B 2200/0072* (2013.01)

(58) Field of Classification Search

CPC .... B25H 1/04; B25H 3/02; B62B 1/00; B62B 1/12

See application file for complete search history.

(56) References Cited

U.S. PATENT DOCUMENTS

| | | | | |
|---|---|---|---|---|
| 4,759,560 | A | 7/1988 | Virgulti | |
| 5,893,572 | A | 4/1999 | Parks | |
| 7,278,644 | B2 | 10/2007 | Villarreal | |
| 9,050,992 | B2 * | 6/2015 | Smith ...................... | B25H 1/04 |
| 2006/0006621 | A1 | 1/2006 | Santa Cruz et al. | |
| 2015/0028554 | A1 | 1/2015 | Schneider | |

* cited by examiner

*Primary Examiner* — John D Walters
*Assistant Examiner* — James J Triggs
(74) *Attorney, Agent, or Firm* — Volpe and Koenig, P.C.

(57) ABSTRACT

A portable workstation which includes a hand truck; a toolbox which can be detached from the hand truck, and a tray which can be detached from an upper portion of the hand truck. The hand truck has a mass and angular relation to the toolbox configured to stably oppose a torque created by a weight of the tray and a load supported by the tray if the toolbox is detached from the hand truck portion. The toolbox includes a top cover which is reversible to convert the toolbox into a seat.

20 Claims, 11 Drawing Sheets

PORTABLE WORKSTATION

CROSS REFERENCE TO RELATED APPLICATION

This application claims the benefit of U.S. provisional application No. 62/332,455, filed May 5, 2016, which is incorporated by reference as if fully set forth.

FIELD OF INVENTION

The invention relates to portable toolboxes and workstations.

BACKGROUND

Technicians, service personnel, tradesmen, and the like may work in a variety of locations throughout the workday, and may require the use of a portable computer and/or various tools to accomplish their tasks. In many locations however there may be no suitable place to set the laptop in relation to the task at hand, and there may be no convenient place for the worker to sit.

Accordingly, it may be desired to provide a portable toolbox and workstation which addresses these issues.

SUMMARY

Some embodiments provide a portable workstation. The workstation includes a hand truck; a toolbox which can be detached from the hand truck, and a tray which can be detached from an upper portion of the hand truck. The hand truck has a mass and angular relation to the toolbox configured to oppose a torque created by the tray if the toolbox is detached from the hand truck portion. The toolbox includes a top cover which is reversible to convert the toolbox into a seat.

In some embodiments, the hand truck includes a base having a mass and angular relation to the toolbox sufficient to oppose a torque created by the tray on a condition that the toolbox is detached from the hand truck In some embodiments, the hand truck includes a plurality of weighted supports having a mass and angular relation to the toolbox sufficient to oppose a torque created by the tray on a condition that the toolbox is detached from the hand truck. In some embodiments, the hand truck includes a mass and angular relation to the toolbox sufficient to stably a torque created by the tray on a condition that the tray is coupled to the upper portion in a direction facing the toolbox. In some embodiments, the hand truck includes a mass and angular relation to the toolbox sufficient to oppose a torque created by the tray on a condition that the tray is coupled to the upper portion in a direction facing away from the toolbox and on a condition that the toolbox is coupled to the hand truck. In some embodiments, the top cover includes a seat cushion on a reverse side of the top cover. In some embodiments, the top cover can be lifted to provide access to an interior of the toolbox while the toolbox is coupled to the hand truck. In some embodiments, from a closed position where an obverse side of the top cover is exposed, the top cover can be pivoted and slid to reverse the top cover and reveal a reverse side of the top cover comprising a seat cushion. In some embodiments, the tray can be attached to the upper portion of the hand truck either in a direction facing the toolbox or in a direction facing away from the toolbox. In some embodiments, the tray includes a cantilever.

Some embodiments provide a portable workstation. The workstation includes a hand truck; a toolbox detachable from the hand truck; and a tray detachable from an upper portion of the hand truck. The hand truck is configured to resist tipping if the toolbox is detached from the hand truck. The toolbox includes a top cover which is reversible to convert the toolbox into a seat.

In some embodiments, the hand truck includes a base having a mass and angular relation to the toolbox sufficient to oppose a torque created by tray on a condition that the toolbox is detached from the hand truck In some embodiments, the hand truck includes a plurality of weighted supports having a mass and angular relation to the toolbox sufficient to stably a torque created by the tray on a condition that the toolbox is detached from the hand truck. In some embodiments, the hand truck includes a mass and angular relation to the toolbox sufficient to oppose a torque the tray on a condition that the tray is coupled to the upper portion in a direction facing the toolbox. In some embodiments, the hand truck includes a mass and angular relation to the toolbox sufficient to oppose a torque created by the tray on a condition that the tray is coupled to the upper portion in a direction facing away from the toolbox and on a condition that the toolbox is coupled to the hand truck. In some embodiments, the top cover includes a seat cushion on a reverse side of the top cover. In some embodiments, the top cover can be lifted to provide access to an interior of the toolbox while the toolbox is coupled to the hand truck. In some embodiments, from a closed position where an obverse side of the top cover is exposed, the top cover can be pivoted and slid to reverse the top cover and reveal a reverse side of the top cover comprising a seat cushion. In some embodiments, the tray can be attached to the upper portion of the hand truck either in a direction facing the toolbox or in a direction facing away from the toolbox. In some embodiments, the tray includes a cantilever.

BRIEF DESCRIPTION OF THE DRAWING(S)

Figure 3:
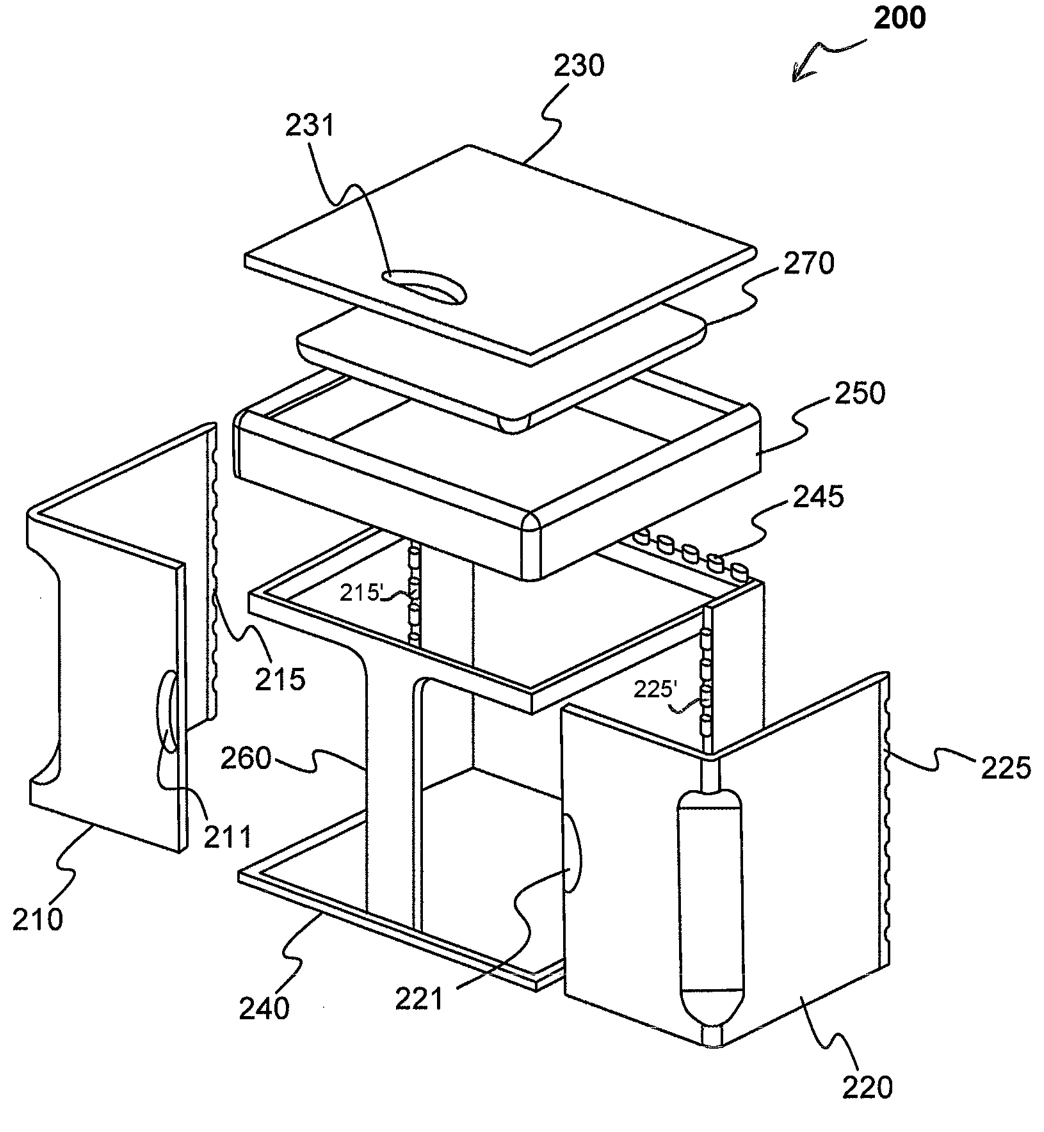
FIG. 3 is an exploded perspective view of the toolbox portion of FIG. 2.

FIGS. 4A, 4B, 4C, and 4D are front perspective views of the toolbox portion in FIG. 3, illustrating example structures and an example sequence of operations which convert the toolbox portion into a seat.

Figure 1:
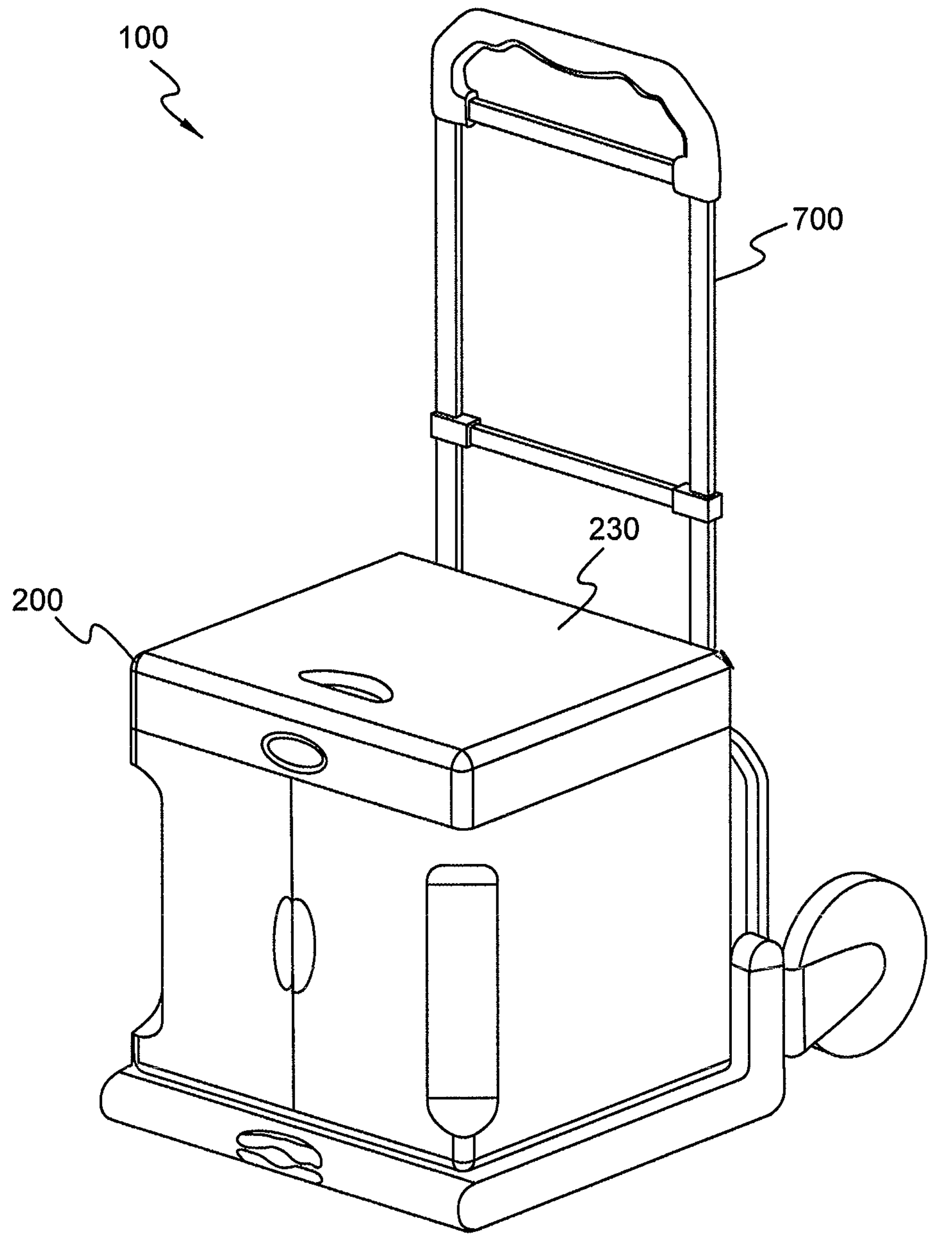
FIG. 1 is a perspective front view of an example portable workstation.
Figure 5:
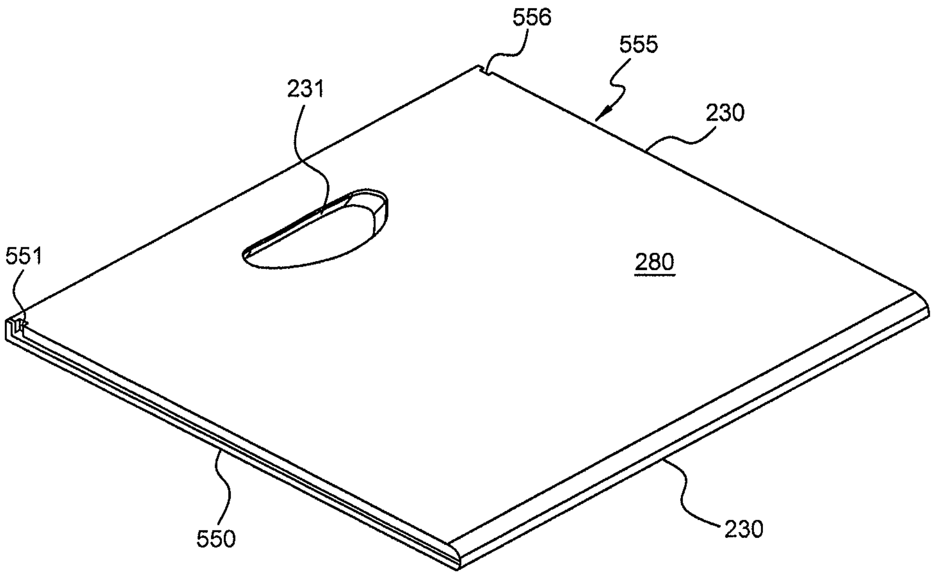
Figure 6:
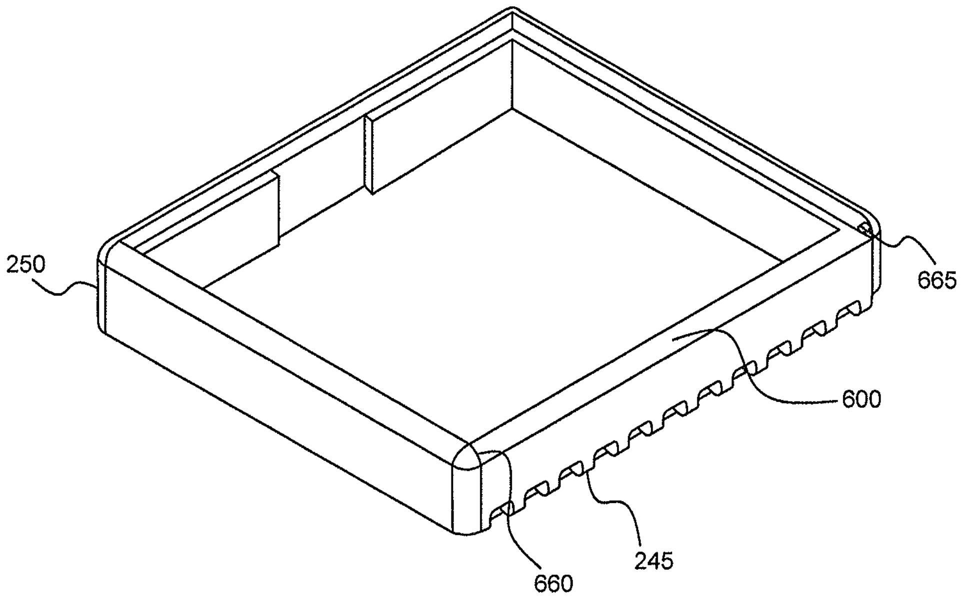
Figure 7:
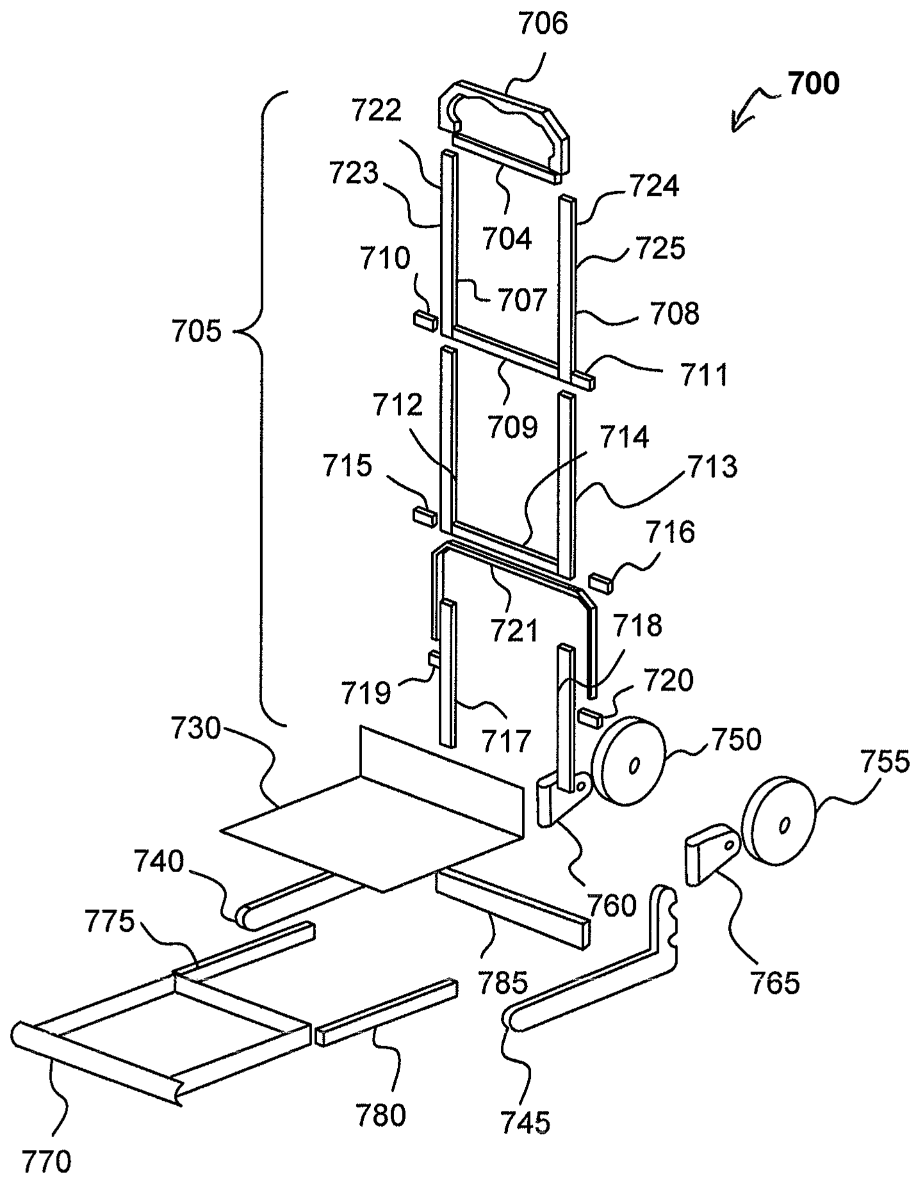
Figure 8:
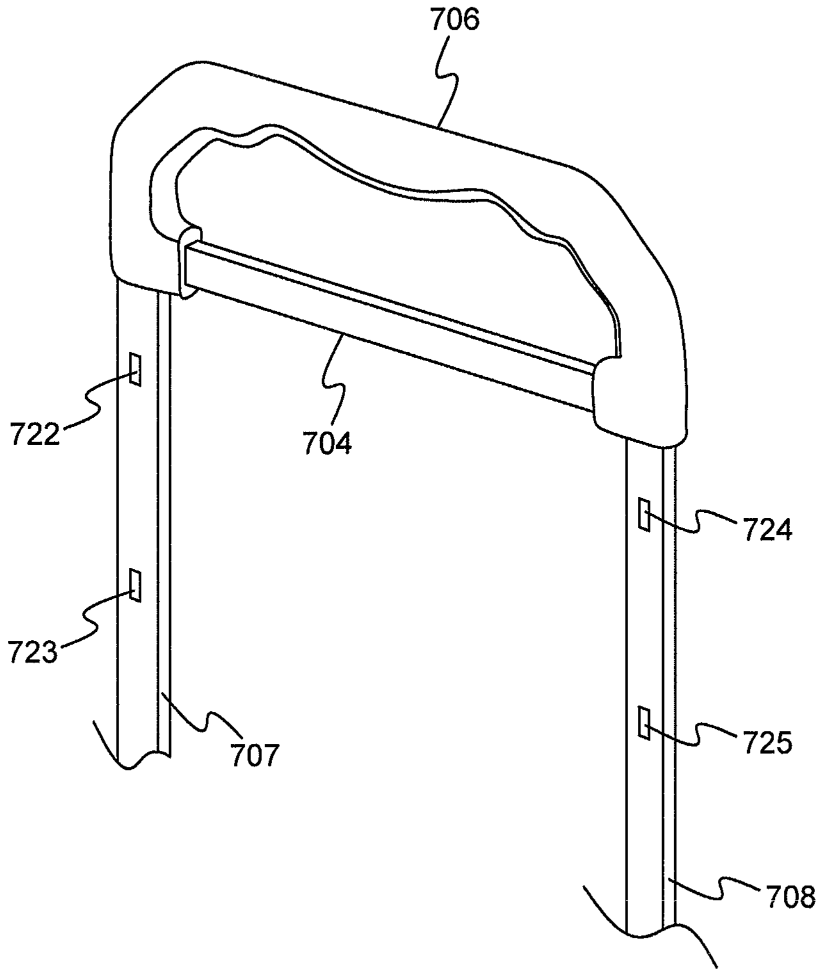
Figure 9:
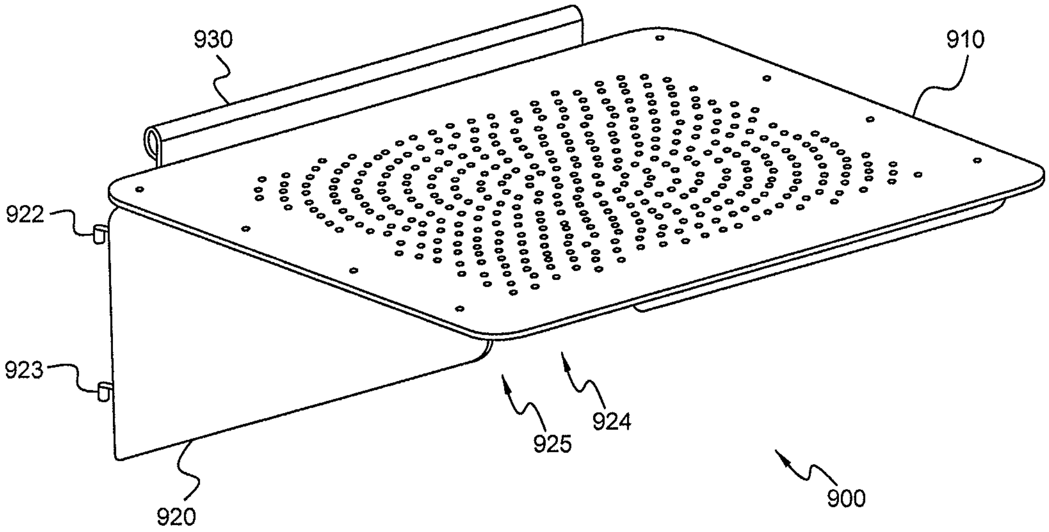
Figure 10:
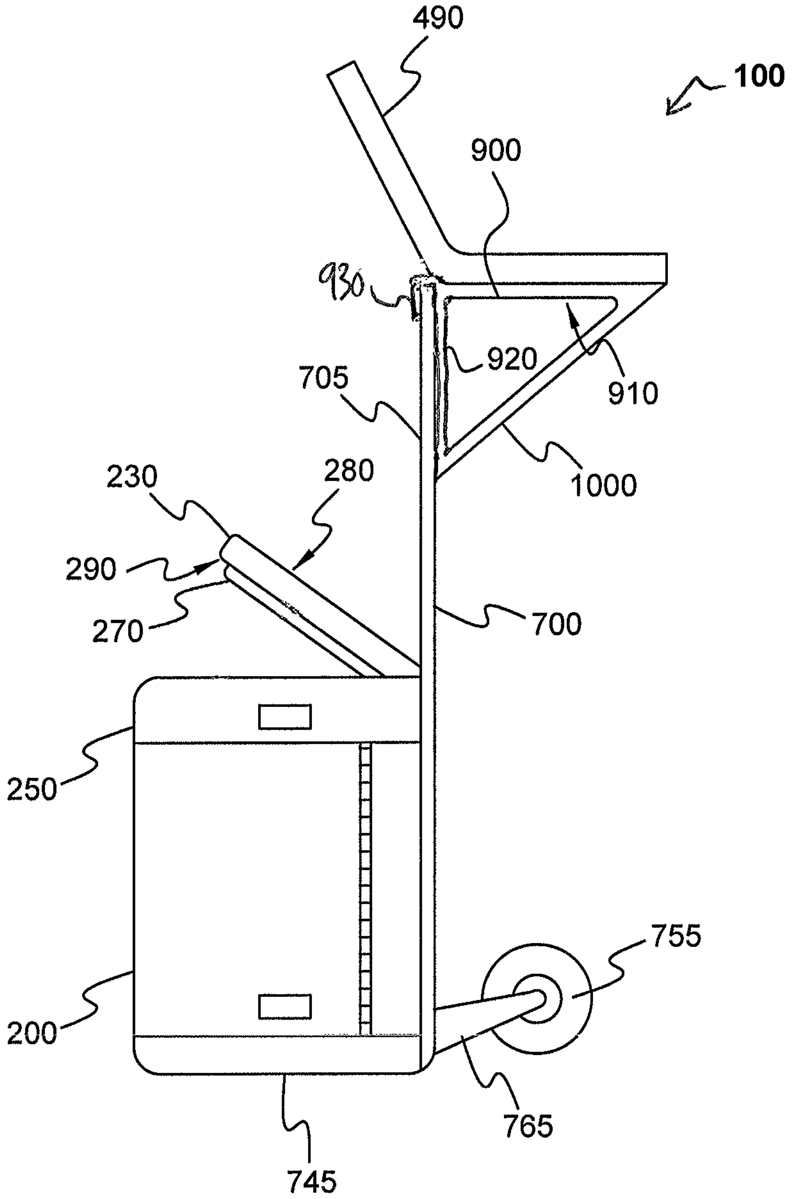
Figure 11:
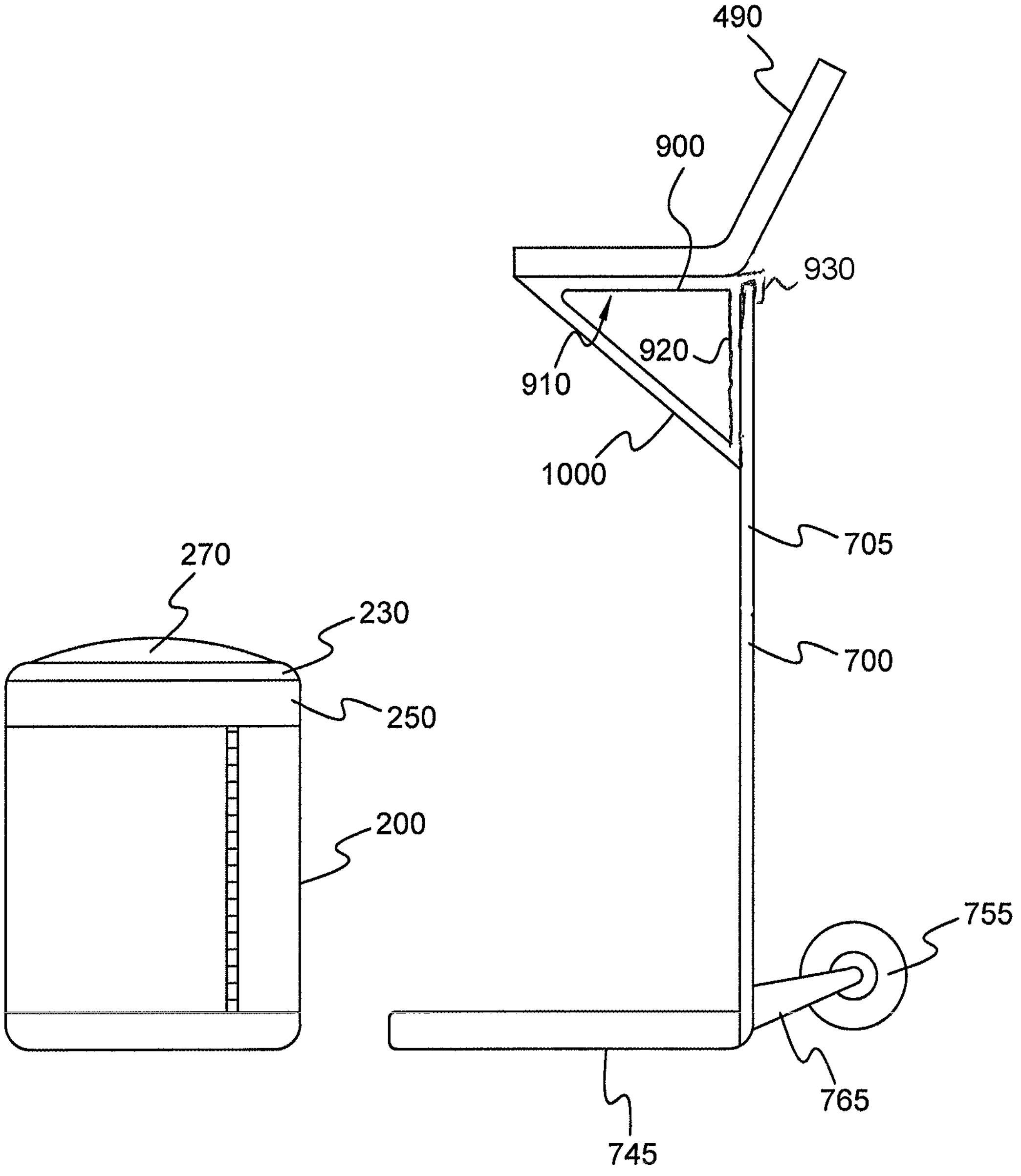

FIG. 5 is a side perspective view of a reversible cover of the toolbox portion in FIG. 3 which illustrates an example slot;

FIG. 6 is a side perspective view of a top compartment of the toolbox portion in FIG. 3 which illustrates example pivots;

FIG. 7 is an exploded perspective view of an example hand truck portion of the portable workstation of FIG. 1;

FIG. 8 is a front perspective view of a portion of the hand truck portion in FIG. 7, enlarged to show detail;

FIG. 9 is a rear perspective view of a top tray which is attachable to the hand truck portion in FIG. 7;

FIG. 10 is a side view of the portable workstation of FIG. 1, showing the top tray of FIG. 9 attached; and FIG. 11 is a side view of the portable workstation of FIG. 1, showing the top tray of FIG. 9 attached, and the toolbox portion detached.

DETAILED DESCRIPTION OF THE PREFERRED EMBODIMENT(S)

FIG. 1 is a perspective front view of an example portable workstation 100. Workstation 100 includes toolbox portion 200 and hand truck portion 700. Toolbox 200 section is detachably coupled to hand truck portion 700. In the example implementation shown in FIG. 1, toolbox portion 200 includes a reversible cover 230, lower compartment doors 210, 220, and reversible cover 230.

Figure 2:
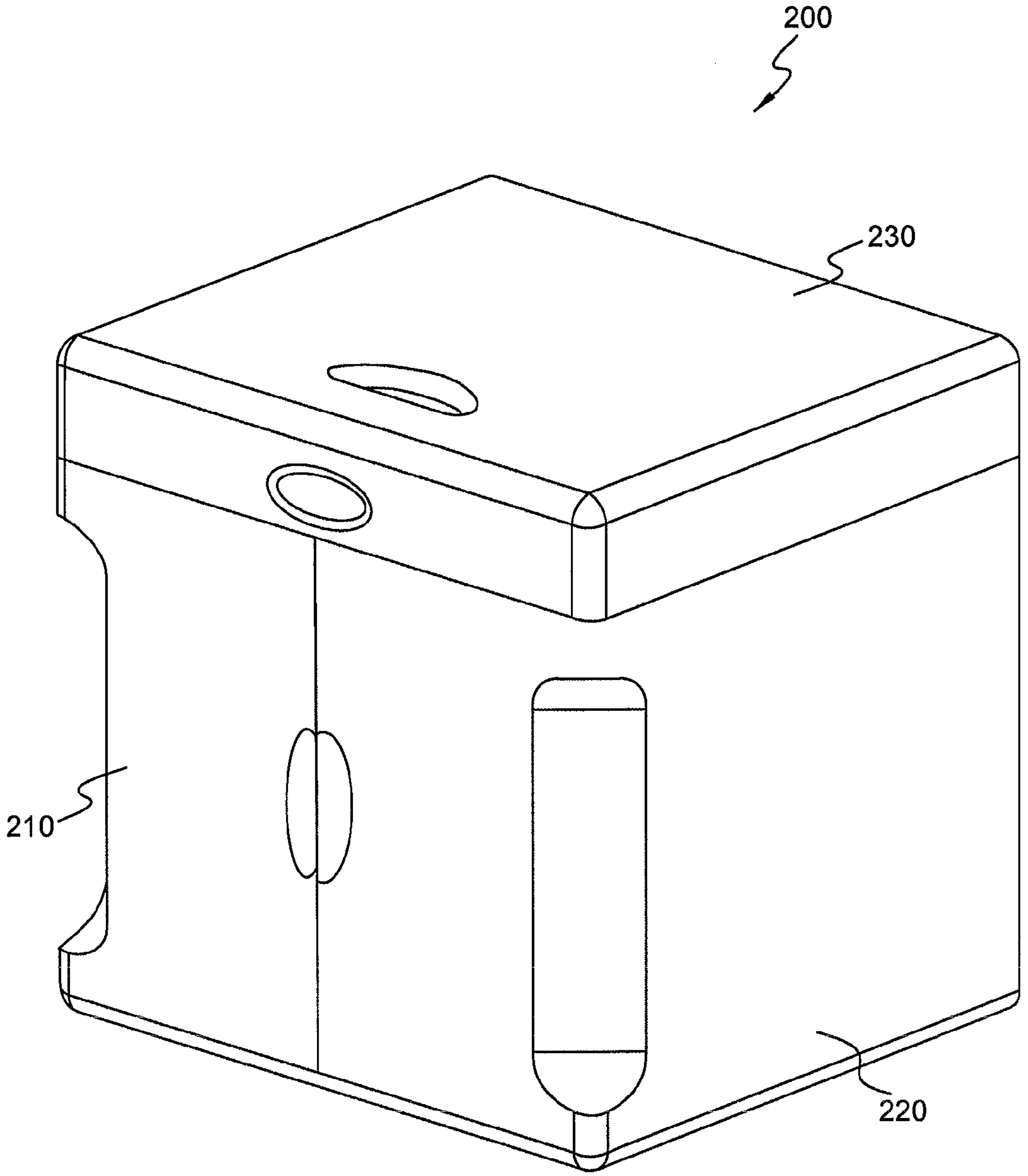
FIG. 2 is a perspective front view of an example toolbox portion of the portable workstation of FIG. 1.

FIG. 2 is a perspective front view of toolbox portion 200 detached from hand truck portion 700. Toolbox portion 200 includes lower compartment doors 210, 220, and reversible cover 230. Lower compartment doors 210, 220 and reversible cover 230 are disposed to provide access to interior compartments of toolbox portion 200. In the example toolbox portion 200, lower compartment doors 210, 220 and reversible cover 230 are disposed such that they can be opened whether or not toolbox portion 200 is attached to hand truck portion 700. Lower compartment doors 210, 220 can include handles 211 and 221 respectively, and upper compartment door 230 can include handle 231. It is noted that toolbox portion 200 is exemplary, and other implementations may omit any of these described features, or may include other features.

FIG. 3 is an exploded perspective view of toolbox portion 200, illustrating further aspects. In this example, toolbox portion 200 includes a lower compartment 240 and an upper compartment 250. Lower compartment doors 210, 220 are connectable to lower portion 240 using hinges 215, 215', 225, 225'. In the examples provided herein, hinges 215, 215', 225, 225' (and other hinges described herein) are illustrated as continuous hinges (which may also be referred to as "piano hinges"), however it is noted that any suitable type of hinge or hinges can be used. Lower compartment doors 210 provide side access to the interior of lower compartment 240.

Lower compartment 240 includes a vertical pillar 260. Vertical pillar 260 is disposed to provide structural support to the lower openings in lower compartment 240 that are concealed by lower compartment doors 210, 220. Vertical pillar 260 is disposed to resist downward pressure on lower compartment 240. In the examples provided herein, vertical pillar 260 is illustrated as a single pillar which is centrally located and concealed behind lower compartment doors 210, 220 when they are in the closed position shown in FIGS. 1 and 2. It is noted however that other arrangements are possible. For example, vertical pillar 260 may be constructed such that lower compartment doors 210, 220 close to the sides of vertical pillar 260 such that vertical pillar 260 is visible when lower compartment doors 210, 220 are in the closed position. In another example, additional or alternate pillars may be provided at different points along the openings in lower compartment 240. In other examples, lower compartment 240 may have only one lower compartment door, or may have more than two lower compartment doors.

Upper compartment 250 is attached to lower compartment 240 via hinge 245. Upper compartment 250 is disposed to cover an upper opening 235 in lower compartment 240. Upper compartment 250 includes a reversible cover 230 to which a pad 270 is attached. Pad 270 can include gel padding or any other suitable seating surface. It is noted that in some implementations, upper compartment 250 may be attached to lower compartment 240 in a manner other than via hinge 245, such as via one or more latches, or any other suitable connector or connectors.

Some implementations may omit upper compartment 250, or upper compartment 250 may be fixedly connected to lower compartment 240, omitting upper opening 235. The various components shown in FIG. 3 can be rearranged in any suitable way, omitted, and/or additional components can be added. It will be appreciated that many arrangements are possible.

Reversible cover 230 includes a top side 280 and a bottom side 290 which includes a pad 270 or other seating surface. Reversible cover 230 is inverted to expose a seating surface on bottom side 290, and replaced on toolbox portion 200 with top side 280 down and bottom side 290 up such that toolbox portion 200 can be used as a seat.

FIGS. 4A, 4B, 4C, and 4D are front perspective views of toolbox portion 200 illustrating example structures and an example sequence of operations for inverting reversible cover 230 to convert toolbox portion 200 into a seat. Toolbox portion 200 is shown detached from hand truck portion 700 in this example, however in other implementations it is not necessary to detach toolbox portion 200 from hand truck portion 700 to convert tool box section 200 into a seat. It is noted that FIGS. 4A, 4B, 4C, and 4D are exemplary, and some implementations of workstation 100 may omit this feature, or may implement it in a different way.

Figure 4A:
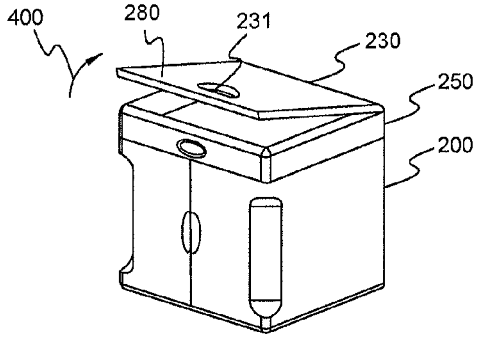

FIG. 4A illustrates a first step where reversible cover 230 is lifted (e.g., using handle 231) to pivot in the direction of arrow 400, opening upper compartment 250. In this example, reversible cover 230 includes slots which are engaged with pivots of upper compartment 250 (e.g., slots 550, 555 and pivots 660, 665 as described below with respect to FIGS. 5 and 6). Any other suitable pivoting and sliding relation between reversible cover 230 and upper compartment 250 may be used in other implementations. For example, in some implementations, reversible cover 230 may include pivots engaged with slots of upper compartment 250, and so forth.

Figure 4B:
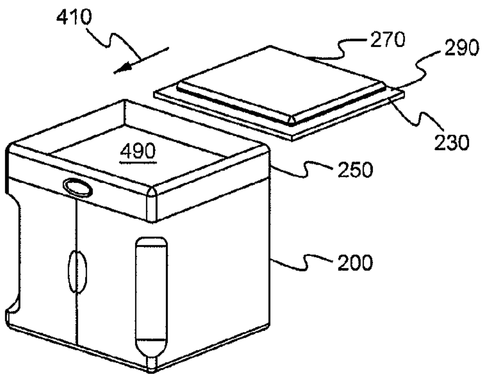

FIG. 4B illustrates a second step where reversible cover 230 has been pivoted 180 degrees from the closed position to fully reveal the interior of upper compartment 250 and pad 270. In this example, the interior of upper compartment 250 includes sufficient space to store various objects (for example, a laptop computer 490). From this position, the slots of reversible cover 230 can remain slidably engaged with the pivots of upper compartment 250, as will be described further with respect to FIG. 5, and reversible cover 230 can be slid along upper compartment 250 in the direction of arrow 410 via the sliding engagement of the pivots and slots.

Figure 4C:
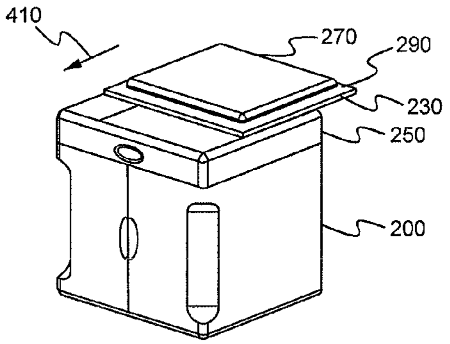
Figure 4D:
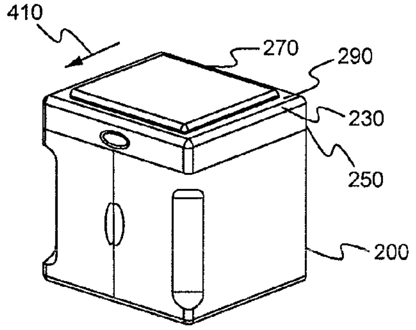

FIG. 4C illustrates a further progression of the second step illustrated in FIG. 4B, but where reversible cover 230 has been slid part way along upper compartment 250 in the direction of arrow 410 via the sliding engagement of the pivots and slots. FIG. 4D illustrates the final position of the reversible cover 230 after having been slid completely along upper compartment 250 in the direction of arrow 410 via the sliding engagement of the pivots and slots. In the position illustrated in FIG. 4D, toolbox portion 200 can be used as a seat, with pad 270 usable as a seating surface.

As discussed above, reversible cover 230 can be inverted and connected to or placed on tool box section 200 in any other suitable way. For example, reversible cover may be simply flipped and placed on upper compartment 250 or rested on a shoulder within upper compartment 250. Other suitable arrangements will be evident to those skilled in the art.

FIG. 5 is a side perspective view of reversible cover 230 illustrating an example slot 550. A corresponding slot 555 is present on the far side of reversible cover 230. Slot 550 includes a notch 551, and corresponding slot 555 includes a notch 556. Notches 551 and 556 are disposed to receive pivots of upper compartment 250 (e.g., pivots 660, 665 as described below with respect to FIG. 6) into slot 550 and slot 555 respectively such reversible cover 230 can be attached to and detached from upper compartment 250.

FIG. 6 is a side perspective view of top compartment 250, illustrating example pivots 660 and 665. Pivots 660 and 665 are disposed to engage slots 550 and 555, as shown and described with respect to FIG. 5, respectively. Pivots 660 and 665 can engage slots 550 and 555 respectively via, for example, notches 551 and 556. Top compartment 250 also includes shoulder 600. Shoulder 600 can engage a portion of bottom surface 290 of reversible cover 230 (shown and described, e.g., with respect to FIGS. 4B, 4C, and 4D) near its perimeter to seat reversible cover 230 in the position shown in FIG. 1. Shoulder 600 can also engage a portion of top surface 280 (shown and described, e.g., with respect to FIGS. 4A and 5) near its perimeter to seat reversible cover 230 in the position shown in FIG. 4D.

FIG. 7 is an exploded perspective view of hand truck portion 700, illustrating further aspects. In this example, hand truck portion 700 includes a telescoping handle 705 which includes grip portion 706, top cross member 704, upper support members 707, 708, upper cross member 709, upper clamp members 710, 711, middle support members 712, 713, middle cross member 714, middle clamp members 715, 716, lower support members 717, 718, lower clamp members 719, 720, and frame member 721. Upper support members 707, 708 include mounting slots 722, 723, 724, 725.

Hand truck portion 700 also includes a base 730 and weighted supports 740, 745 upon which toolbox 200 can be placed or detachably mounted. In some implementations, toolbox 200 can be permanently mounted to hand truck portion 700. Support 785 is connectable to weighted supports 740, 745 and can receive lower support members 717, 718. Wheels 750, 755 are mountable to weighted supports 740, 745 by mounting brackets 760, 765 respectively. An accessory drawer 770 is mountable to weighted supports 740, 745 by drawer sliders 775, 780 respectively. It is noted that the components of hand truck portion 700 are exemplary and that various components described with respect to FIG. 7 can be omitted and/or various other components may be added. Further, the various components can be modified. In some implementations for example, telescoping handle 705 can be substituted with a non-telescoping handle.

FIG. 8 is a front perspective view of a portion of telescoping handle 705 and as shown in FIG. 7, enlarged to show detail of grip portion 706, top cross member 704, upper support members 707, 708 and mounting slots 722, 723, 724, 725. Mounting slots 722, 723, 724, 725 can extend through upper support member 707, 708 respectively to accept mounting hooks from either side of upper support member 707, 708.

FIG. 9 is a rear perspective view of a top tray 900. Top tray 900 includes a work surface 910 and a mounting surface 920. In this example, work surface 910 is substantially horizontal and mounting surface 920 is substantially vertical. In this configuration, work surface 910 is substantially perpendicular to mounting surface 920. It is noted however that these orientations can vary depending on the desired implementation. For example, the relation of work surface 910 and mounting surface 920 can be adjustable in some implementations. This can have the advantage of facilitating adjusting the angle of work surface 920 for the convenience of a user, or for allowing work surface 910 to be folded parallel or substantially parallel to mounting surface 920 for storage. Work surface 910 can be adapted for use with a laptop (e.g., as a shelf to support laptop 490). For example, work surface 910 may include a number of holes configured to provide ventilation.

Mounting surface 920 includes mounting hooks 922 and 923, disposed to engage with mounting slots 722 and 723 of telescoping handle 705. Mounting surface 920 also includes corresponding mounting hooks 924 and 925 (not shown), disposed to engage with mounting clots 724 and 725 of telescoping handle 705. Top tray 900 also includes mounting hook 930, disposed to engage with top cross member 704 of telescoping handle 705. It is noted that mounting hook 930 may be attached to or a part of mounting surface 920 and/or work surface 910 depending upon the desired implementation. It is noted that the slot and hook (i.e., slots 722, 723, 724, 725, hooks 922, 923, 924, 925, and hook 930) attachment mechanism is merely exemplary, and that top tray 900 can be mounted to telescoping handle 705 in any suitable manner. Work surface 910 can extend from mounting surface 920 as a cantilever, or can be supported as will be described further.

FIG. 10 is a side view of workstation 100 showing top tray 900 assembled to telescoping handle 705. Top tray 900 includes a stabilizer 1000 to support work surface 910. It is noted that in other implementations, stabilizer 1000 can be omitted, and work surface 910 can be implemented as a cantilever. As shown in FIG. 10, top tray 900 is assembled to telescoping handle 705 on a side opposite toolbox portion 200. Top tray 900 is shown supporting laptop 490 in an example use case, however top tray 900 can be used for any suitable purpose. As shown in FIG. 10, toolbox portion 200 is assembled to hand truck portion 700, and the combined weight of toolbox portion 200 and hand truck portion stabilizes top tray 900 and laptop 490.

FIG. 11 is another side view of workstation 100 showing top tray 900 assembled to telescoping handle 705. As shown in FIG. 11, top tray 900 is assembled to telescoping handle 705 on a side facing toolbox portion 200. As in FIG. 10, top tray 900 is shown supporting laptop 490 in an example use case, however top tray 900 can be used for any suitable purpose. As shown in FIG. 11, toolbox portion 200 is separated from hand truck portion 700. The weight distribution of hand truck portion 700 is such that top tray 900 and laptop 490 are stabilized without the added weight of toolbox portion 200.

In some implementations for example, weighted supports 740, 745 have a mass and angular relation to telescoping handle 705 which opposes the torque created by the weight of top tray 900 (and any suitable load positioned on top tray 900, such as laptop 490) on hand truck portion 700 to counterbalance and stabilize top tray 900 during use. In other words, weighted supports 740, 745 can have a mass and angular relation to telescoping handle 705 which prevents hand truck portion 700 from tipping over when top tray 900 is installed and a load is positioned on top tray 900, even when toolbox portion 200 is separated from hand truck portion 700. Weighted supports 740, 745 are used here for example, however any other suitable component or combination of components of hand truck portion 700 can have a mass and angular relation to telescoping handle 705 which prevents hand truck portion 700 from tipping over when top tray 900 is installed and a load is positioned on top tray 900.

In some implementations, the mass and angular relation of weighted supports 740, 745 to telescoping handle 705 are configured to oppose this torque (and prevent tipping) if top tray 900 is installed on telescoping handle 705 in either direction; i.e., facing toward (as shown in FIG. 11) or away from (as shown in FIG. 10) toolbox portion 200.

In other implementations, the mass and angular relation of weighted supports 740, 745 to telescoping handle 705 may be configured to oppose the torque when top tray 900 is installed in one particular direction, and not necessarily the other. For example, in some implementations the mass and angular relation of weighted supports 740, 745 to telescoping handle 705 can be configured to ensure that hand truck portion 700 remains standing, even when toolbox portion 200 is separated from hand truck portion 700, if the top tray 900 is installed on telescoping handle 705 facing the direction of toolbox portion 200 (as shown in FIG. 11) but not necessarily when the top tray 900 is installed on telescoping handle facing away from toolbox portion 200 (as shown in FIG. 10).

Although features and elements are described above in particular combinations, one of ordinary skill in the art will appreciate that each feature or element can be used alone or in any combination with the other features and elements.

What is claimed is:

1. A portable workstation, comprising:

a hand truck portion;

a toolbox portion detachably couplable to the hand truck portion; and a tray detachably couplable to an upper portion of the hand truck portion;

the hand truck portion comprising a mass and angular relation to the tray configured to oppose a torque created by the tray on a condition that the toolbox portion is detached from the hand truck portion;

the toolbox portion comprising a top cover which is reversible to convert the toolbox portion into a seat.

2. The portable workstation of claim 1, wherein the hand truck portion comprises a base having a mass and angular relation to the toolbox portion sufficient to oppose a torque created by the on a condition that the toolbox portion is detached from the hand truck portion.

3. The portable workstation of claim 1, wherein the hand truck portion comprises a plurality of weighted supports having a mass and angular relation to the toolbox portion sufficient to oppose a torque created by the tray on a condition that the toolbox portion is detached from the hand truck portion.

4. The portable workstation of claim 1, wherein the hand truck portion comprises a mass and angular relation to the toolbox portion sufficient to oppose a torque created the tray on a condition that the tray is coupled to the upper portion in a direction facing the toolbox portion.

5. The portable workstation of claim 1, wherein the hand truck portion comprises a mass and angular relation to the toolbox portion sufficient to oppose a torque created by the tray on a condition that the tray is coupled to the upper portion in a direction facing away from the toolbox portion and on a condition that the toolbox portion is coupled to the hand truck portion.

6. The portable workstation of claim 1, wherein the top cover comprises a seat cushion on a reverse side of the top cover.

7. The portable workstation of claim 1, wherein the top cover is liftable to provide access to an interior of the toolbox portion while the toolbox portion is coupled to the hand truck portion.

8. The portable workstation of claim 1, wherein, from a closed position where an obverse side of the top cover is exposed, the top cover is pivotable and slidable to reverse the top cover and reveal a reverse side of the top cover comprising a seat cushion.

9. The portable workstation of claim 1, wherein the tray is couplable to the upper portion of the hand truck portion either in a direction facing the toolbox portion or in a direction facing away from the toolbox portion.

10. The portable workstation of claim 1, wherein the tray comprises a cantilever.

11. A portable workstation, comprising:

a hand truck portion;

a toolbox portion detachably couplable to the hand truck portion; and a tray detachably couplable to an upper portion of the hand truck portion;

the hand truck portion configured to resist tipping on a condition that the toolbox portion is detached from the hand truck portion;

the toolbox portion comprising a top cover which is reversible to convert the toolbox portion into a seat.

12. The portable workstation of claim 11, wherein the hand truck portion comprises a base having a mass and angular relation to the toolbox portion sufficient to oppose a torque created by the tray and on a condition that the toolbox portion is detached from the hand truck portion.

13. The portable workstation of claim 11, wherein the hand truck portion comprises a plurality of weighted supports having a mass and angular relation to the toolbox portion sufficient to oppose a torque created by the tray on a condition that the toolbox portion is detached from the hand truck portion.

14. The portable workstation of claim 11, wherein the hand truck portion comprises a mass and angular relation to the toolbox portion sufficient to oppose a torque created by the tray on a condition that the tray is coupled to the upper portion in a direction facing the toolbox portion.

15. The portable workstation of claim 11, wherein the hand truck portion comprises a mass and angular relation to the toolbox portion sufficient to oppose a torque created by the tray on a condition that the tray is coupled to the upper portion in a direction facing away from the toolbox portion and on a condition that the toolbox portion is coupled to the hand truck portion.

16. The portable workstation of claim 11, wherein the top cover comprises a seat cushion on a reverse side of the top cover.

17. The portable workstation of claim 11, wherein the top cover is liftable to provide access to an interior of the toolbox portion while the toolbox portion is coupled to the hand truck portion.

18. The portable workstation of claim 11, wherein, from a closed position where an obverse side of the top cover is exposed, the top cover is pivotable and slidable to reverse the top cover and reveal a reverse side of the top cover comprising a seat cushion.

19. The portable workstation of claim 11, wherein the tray is couplable to the upper portion of the hand truck portion either in a direction facing the toolbox portion or in a direction facing away from the toolbox portion.

20. The portable workstation of claim 11, wherein the tray comprises a cantilever.

* * * * *